(12) United States Patent
Ericksson

(10) Patent No.: US 6,263,931 B1
(45) Date of Patent: Jul. 24, 2001

(54) TRIMMING MEMBER ARRANGEMENT FOR A TREE TRIMMING DEVICE

(75) Inventor: Jan A. Ericksson, Osterfarnebo (SE)

(73) Assignee: Caterpillar S.A.R.L., Geneva (CH)

( * ) Notice: Subject to any disclaimer, the term of this patent is extended or adjusted under 35 U.S.C. 154(b) by 0 days.

(21) Appl. No.: 09/579,073

(22) Filed: May 25, 2000

(51) Int. Cl.$^7$ ................................................ A01G 23/095
(52) U.S. Cl. ...................... 144/24.13; 144/208.1
(58) Field of Search ................. 144/24.13, 338, 144/343, 340, 341, 208.1, 208.8; 83/425.2, 456, 856

(56) References Cited

U.S. PATENT DOCUMENTS

| | | |
|---|---|---|
| 4,194,542 | 3/1980 | Ericksson . |
| 4,369,824 * | 1/1983 | Dressler et al. ................ 144/24.13 |
| 4,515,192 | 5/1985 | Ericksson . |
| 4,769,909 * | 9/1988 | Ducret ................................ 83/456 |
| 4,922,976 | 5/1990 | Hacker . |
| 4,974,648 | 12/1990 | Propst . |
| 5,219,010 | 6/1993 | Ericksson . |
| 5,975,168 | 11/1999 | Ericksson . |
| 6,070,627 * | 6/2000 | Hamby, Jr. ................... 144/24.13 |

FOREIGN PATENT DOCUMENTS

| | | | |
|---|---|---|---|
| 791537 * | 12/1980 | (SU) ................... | 144/24.13 |
| 1253793 * | 2/1986 | (SU) ................... | 144/24.13 |

* cited by examiner

*Primary Examiner*—Ed Tolan
(74) *Attorney, Agent, or Firm*—James R. Smith

(57) ABSTRACT

A first tree engaging device is attached to the first trimming member and maintains the first trimming member at a transverse position relative to the tree trunk during relative longitudinal movement of the tree trunk. The first trimming member includes a knife portion which includes a knife edge portion structured and arranged to form an angle ($\phi$) relative to the tree trunk surface when placed adjacent to the tree trunk.

17 Claims, 3 Drawing Sheets

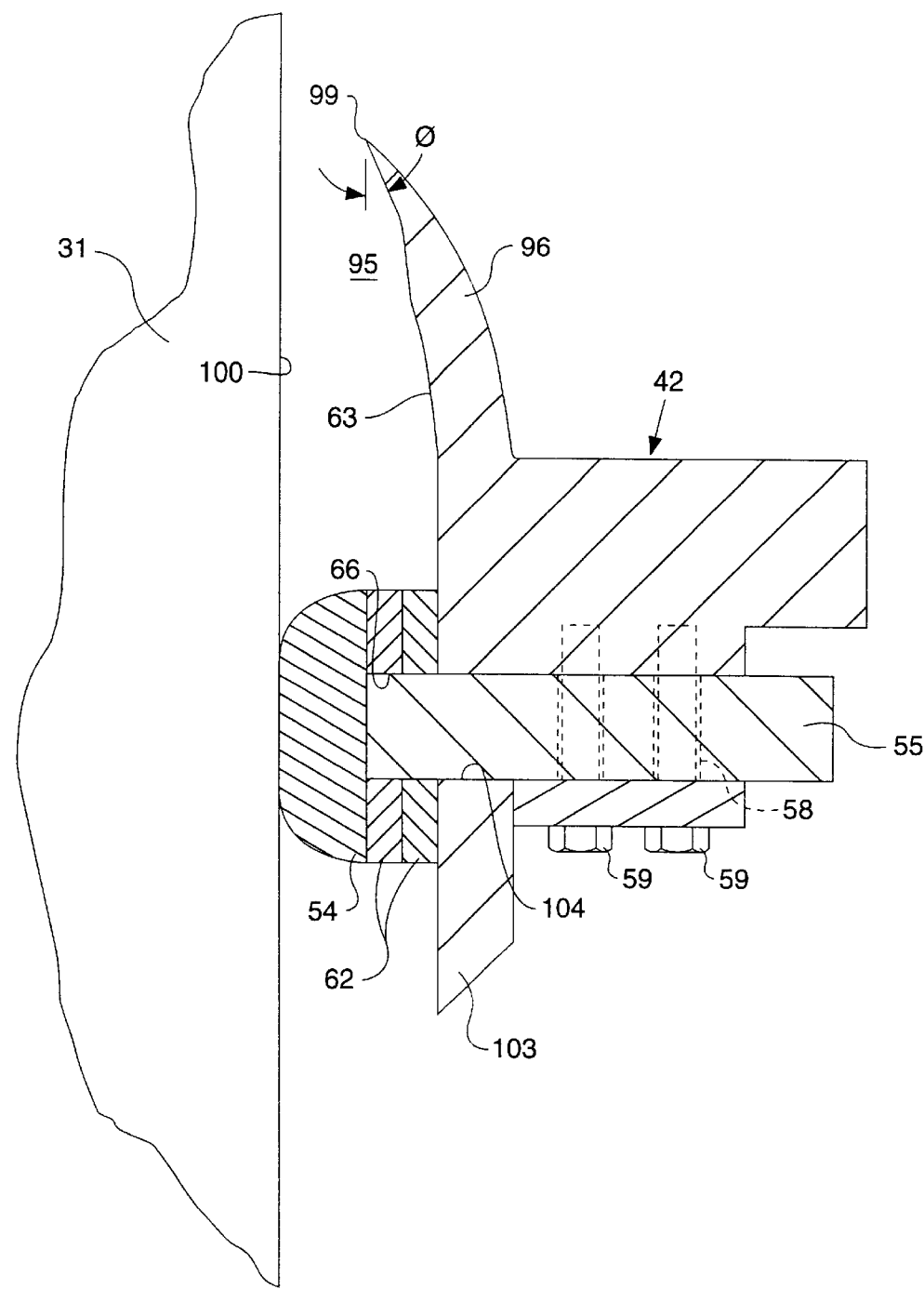

TRIMMING MEMBER ARRANGEMENT FOR A TREE TRIMMING DEVICE

TECHNICAL FIELD

This invention relates to a trimming member arrangement for a tree trimming device and more particularly to a trimming member arrangement having a knife portion angled relative to a tree trunk surface and a tree engaging device, spaced a distance from the knife edge, for adjusting the transverse position of the trimming member relative to the tree trunk.

BACKGROUND ART

Typically, tree trimming devices are provided with a harvester head of the type used with tree harvesting machines. Such trimming devices are used to delimb and debark trees. Some tree trimming devices may include one or more trimming members which are pivotally connected to the harvesting head frame and are operable to pivot laterally in relation to the tree trunk. The tree trimming members are pivotally movable into position about the trunk of the tree being trimmed. At this position it is assumed that trimming members are adequately pressed against the circumference of the tree trunk and in position to trim the tree. The tree trimming device also typically includes a driving device which is operable to longitudinally translate the tree relative to the harvesting head frame. Upon the aforementioned translation, knife portions provided on the trimming members sever the tree limbs, remove the bark, or both.

Tree trimming devices of the aforementioned variety are typically "one-size-fits-all". In other words, they provide very little in regards to on-site modifications to most efficiently match the tree trimming device with the characteristics of the forest being harvested. Applicant is aware of prior art attempts to alleviate the above prior art shortcomings. For example, Applicant's U.S. Pat. No. 5,975,168 teaches a actuator operated first control device having a tree engaging portion moveably connected to the first trimming member which is operable to selectively establish the relative transverse position of the first trimming member relative to the tree trunk. Though such an arrangement performs adequately, it is desirable to both simplify the design and to provide the tree trimming device with further tree variety-matching capabilities in order to most efficiently perform trimming operations regardless of the variety of tree to be harvested The present invention is directed to overcoming one or more of the problems as set forth above.

DISCLOSURE OF THE INVENTION

In one aspect of the present invention, a trimming apparatus for a tree harvesting head having a frame and a driving device connected to the frame and moveable so as to translate a tree trunk longitudinally relative to the frame is provided. The term trimming, in the context of this invention includes tree trunk stripping functions such as delimbing and debarking. The trimming apparatus has a first trimming member having a tree trunk facing side. A first tree engaging device is attached to the first trimming member and is adapted for maintaining the first trimming member at a position relative to the tree trunk during longitudinal translation of the tree trunk.

In another aspect of the present invention, A tree harvesting head is provided. The harvesting head includes a frame and at least one trimming member connected to and movable relative to the frame. Also provided is a driving device connected to the frame and movable to translate a tree trunk longitudinally relative to the frame, and a tree engaging device attachable with at least one trimming and adapted for maintaining the trimming member at a transverse position relative to the tree trunk. Also, each trimming member includes a knife portion having an knife edge portion structured and arranged to form an angle relative to a surface of the tree trunk when situated adjacent the tree trunk, and the tree engaging device is attachable with said trimming member at a distance remote from the knife edge portion. In addition, each trimming member has a substantially concave tree trunk facing side portion substantially between the knife edge portion and the tree engaging device.

In yet another aspect of the present invention, a tree engaging device for use with a tree harvesting head having at least one trimming member is provided. The tree engaging device has a tree engaging portion adapted to engage a surface of the tree trunk, and an attachment portion attached to the tree engaging portion and structured and arranged for coupling said tree engaging portion to said trimming member.

In even yet another aspect of the present invention, a method of trimming a variety of tree types having tree trunks with a harvesting head having a frame, a driving device connected to the frame, and a first trimming member pivotally connected to the frame, and where the first trimming member having a tree engaging device and a knife portion attached therewith, comprises the steps of selecting a knife portion, having an angles edge portion, for the type of tree to be harvested, attaching the knife portion to the first trimming member, adjusting the tree engaging device so as to adjust a transverse position relative to the tree trunk of the first trimming member, positioning the frame of the harvesting head adjacent the tree trunk, moving the first trimming member relative to the frame to a position at which the tree engaging device is engaged with the tree trunk, and moving a one of the tree and harvesting head relative to an other of the tree and harvesting head and trimming the tree with the trimming member.

BRIEF DESCRIPTION OF THE DRAWINGS

FIG. 3 is a diagrammatic cross-sectional view taken along lines 3—3 of FIG. 2.

BEST MODE FOR CARRYING OUT THE INVENTION

Figure 1:
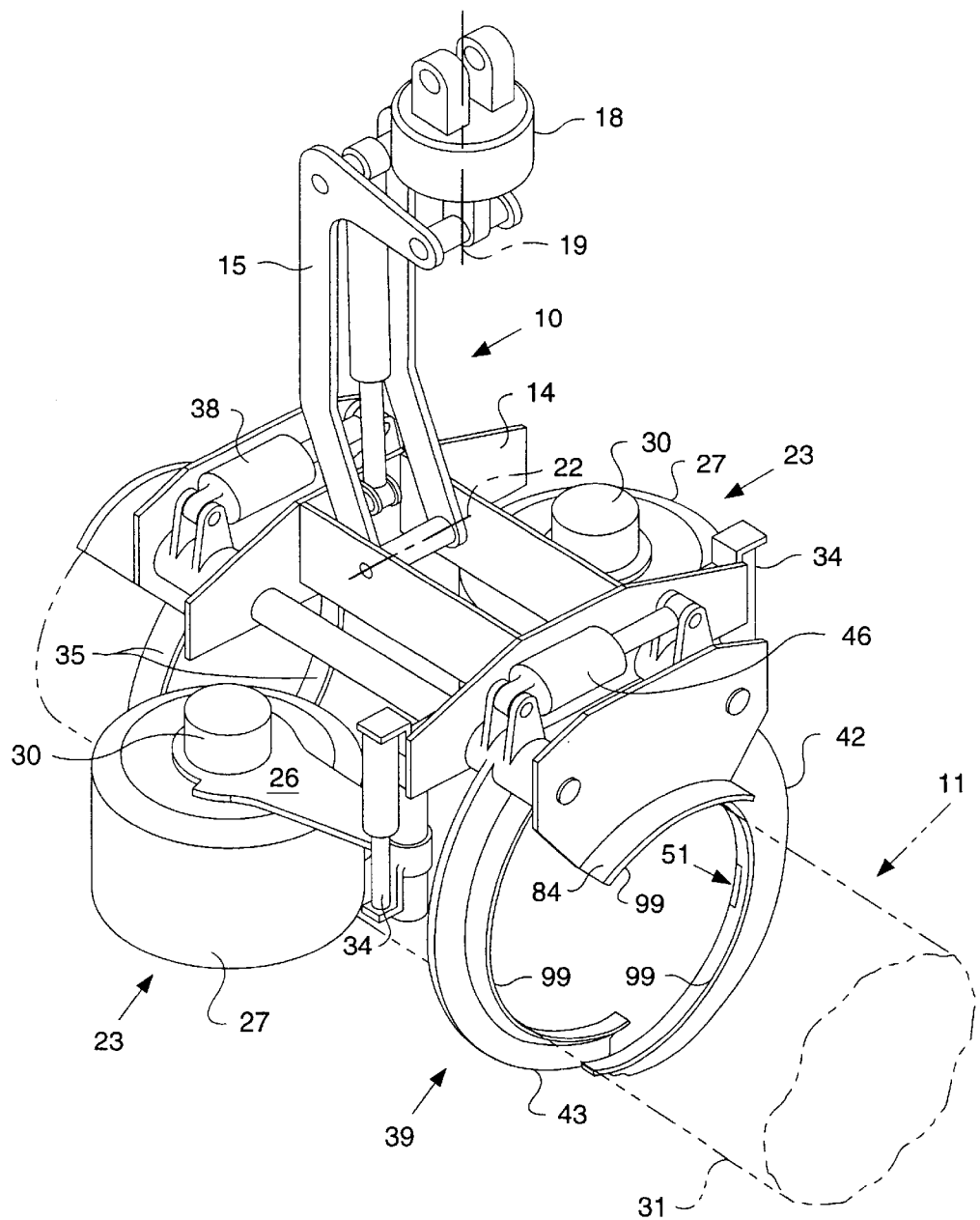
FIG. 1 is a diagrammatic isometric view of a tree harvesting head shown pivoted to a tree trimming position.

With reference now to the Figures, a tree harvesting head 10 for use on a tree harvesting machine, for example, of the type having a plurality of ground engaging wheels and a prime mover for propelling the harvesting machine over the underlying terrain in a conventional manner (all not shown) is provided. The tree harvesting head 10 is movably and selectively positional relative to a tree 11 to be harvested in a conventional manner.

The tree harvesting head 10 has a frame 14 and a connecting frame 15. The connecting frame 15 is connected to the boom by a universal joint (not shown) and a rotator 18 having an axis of rotation 19. The universal joint allows for universal free movement of the connecting frame 15 and the rotator 18 provides powered rotation of the connecting frame 15 about the rotator axis 19. This provides the tree harvesting machine operator with the harvesting capabilities relative to the tree 11 to be harvested.

The frame 14 is pivotally connected to the connecting frame 15 and pivotally movable about a first axis 22 which is transverse the rotator axis 19. A pair of driving devices 23 each having an arm 26, a driving wheel 27 and a motor 30 drivingly connected to the driving wheel 27 is provided. The arms 26 are movably connected to the frame 14 and pivotal to engage the driving wheels 27 with the trunk 31 of the tree 11 being harvested. The driving wheels 27 engage a tree trunk 31 on opposite sides of the tree trunk 31 and longitudinally move the tree trunk 31 relative to the frame 14. The motors 30, preferably hydraulic motors 30, provide controlled rotation of the driving wheels 27 and the longitudinal movement of the tree trunk 31. The arms 26 are each connected to a fluid operated actuator 34 and selectively moveable thereby between a tree engaging position of the driving wheels 27 and a tree receiving position of the driving wheel 27 spaced from the tree engaging position of the driving wheel 27. Such driving devices are well known in the art and will therefor not be discussed in any greater detail.

A pair of clamp arms 35 are pivotally connected to the frame 14 and are movable between a tree receiving position and a tree holding position. The clamp arms 35 are curved, spaced on the frame 14 from the driving devices 23 and hold the tree trunk 31 relative to the frame 14. A fluid operated actuator 38 is pivotally connected to and between the clamp arms 35 to effect selective pivotal movement of the clamp arms 35. Since clamp arms 35 of this type are well known in the art further discussion will be omitted.

A cutoff saw (not shown), for example, a chain saw is pivotally connected to the frame 14 and selectively actuatable to cut the tree trunk 31 off at its base. The cutoff saw is also operative to cut the tree trunk 31 into desired log lengths. Cutoff saws suitable for this application as well known to those skilled in the art and therefore will not be discussed in any greater detail.

Figure 2:
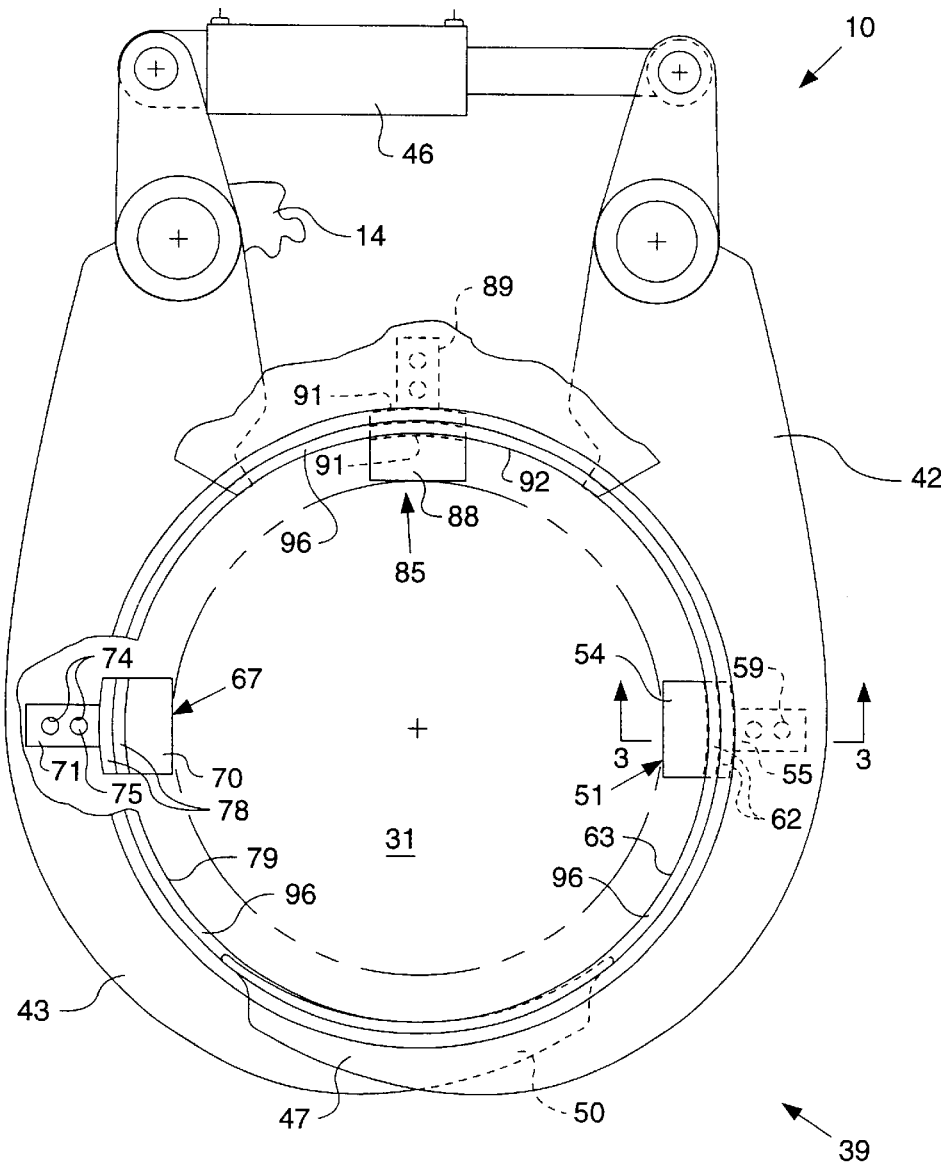
FIG. 2 is a diagrammatic top end view of the tree harvesting head with portions broken away showing tree engaging devices associated with trimming members.

As best seen in FIG. 2, a trimming device 39 has first and second trimming members 42,43 pivotally connected to the frame 14 at locations spaced longitudinally (as in the longitudinal direction of the tree trunk 31 being held by the clamp arms 35) from the driving devices 23 and the clamp arms 35 and spaced apart from each other so as to accommodate the tree trunk 31 therebetween. The first and second trimming members 42, 43 are movable relative to the frame 14 between a tree trunk receiving position and a tree trunk trimming position. In particular 42, 43 and the driving devices 23 are located longitudinally (as in the longitudinal direction of the tree trunk 31 held therebetween) between the first and second trimming members 42,43 and the pair of clamp arms 35. An actuator 46, of a well known type, is pivotally connected to and between the first and second trimming members 42, 43 and operates, in well known ways, to position the first and second trimming members 42, 43 between the tree trunk receiving and engaging positions. The first and second trimming members 42, 43 further include end portions 47, 50 distally located from the frame 14.

A first tree engaging device 51 is attachable with the first trimming member 42. The first tree engaging device 51 is adapted for maintaining the first trimming member 42 at a transverse position relative to the tree trunk 31 during longitudinal translation of the tree trunk 31. The first tree engaging device 51 engages the tree trunk 31 and establishes a selectable transverse position of the first trimming member 42 relative to the tree trunk 31.

Although the specific details of the first tree engaging device 51 will be disclosed more fully hereinafter with respect to FIG. 3, suffice to say for now the first tree engaging device 51 preferably includes a slide shoe or tree engaging portion 54, preferably comprising a durable material, and an attachment portion 55, attached to the tree engaging portion 54, for attaching the tree engaging portion 54 to the first trimming member 42. The attachment portion 55 includes at least one aperture 58 sized to receive a mechanical fastener 59 (as shown best in FIG. 3). The mechanical fastener 59, in turn, is used to affix the attachment portion 55 to the first trimming member 42. At least one shim 62 is provided and is preferably disposed between the tree engaging portion 54 and the tree trunk facing side portion 63 of the first trimming member 42. The shims 62 also preferably comprise a durable material and are provided with openings 66 sized to receive the attachment portion 55.

As will be appreciated by those skilled in such art, the shims 62 are preferably removably attached to the attachment portion 55 allowing for their removal as required by the user. This removable attachment of the shims 62 provides a means for adjusting the transverse position of the first trimming member 42 relative to the tree trunk 31.

A second tree engaging device 67 is attachable with the second trimming member 43. The second tree engaging device 67, like the first tree engaging device 51, is adapted for maintaining the second trimming member 43 at a transverse position relative to the tree trunk 31 during longitudinal translation of the tree trunk 31. The second tree engaging device 67 engages the tree trunk 31 and establishes a selectable transverse position of the second trimming member 43 relative to the tree trunk 31.

The second tree engaging device 67 also preferably includes a slide shoe or tree engaging portion 70, preferably comprising a durable material, and an attachment portion 71, attached to the tree engaging portion 70, for attaching the tree engaging portion 70 to the second trimming member 43. The attachment portion 71 includes at least one aperture 74 sized to receive a mechanical fastener 75. The mechanical fastener 75, in turn, is used to affix the attachment portion 71 to the second trimming member 43. At least one shim 78 is provided and is preferably disposed between the tree engaging portion 70 and the tree trunk facing side portion 79 of the second trimming member 43. In a similar fashion as shims 62, the shims 78 also preferably comprise a durable material and are provided with openings 82 (not shown) sized to receive the attachment portion 71.

Like the above-described arrangement of the shims 62, the shims 78 are preferably removably attached to the attachment portion 71 allowing for their removal as required by the user. This removable attachment of the shims 78 provides a means for adjusting the transverse position of the second trimming member 43 relative to the tree trunk 31.

A third trimming member 84 is rigidly connected to the frame 14 at a location circumferentially spaced relative to the tree trunk 31, between the first and second trimming members 42, 43. The third trimming member 84 serves as a butt plate and further positions the tree trunk 31 being trimmed. A third tree engaging device 85 of substantially identical construction to that of the first and second tree engaging devices 51,67 may be connected to the third trimming member 84 for the identical purpose of maintaining the tree trunk 31 being trimmed at selected transverse position relative to the third trimming member 84. Like the first and second tree engaging devices 51,67, the third tree engaging device 85 comprises a tree engaging portion 88, an attachment portion 89, and at least one shim 91 preferably disposed between the tree engaging portion 88 and the tree trunk facing side portion 92 of the third trimming member 84. Since the third tree engaging device 85 is substantially identical to the first and second tree engaging devices 51,67 additional discussion will be omitted. Shims 62,78,91 embody herein means for transversely adjusting the tree engaging portion relative to, respectively, the first trimming member, the second trimming member and the third trimming member.

With reference now to FIG. 3, shown in cross section is the first trimming member 42 with attached first tree engaging device 51. For exemplary purposes only, the details of the first trimming member and tree engaging device 42,51 will be discussed herein, but it is to be understood that the disclosure herein applies equally to the second trimming member and tree engaging device 43,67 and third trimming member and tree engaging device 84,85.

As shown, it is preferred that the each of the first, second and third tree trunk facing side portions 63,79,92 be substantially concave in structure resulting in a recess 95 defined, for example, by the first tree engaging device 51 and first tree trunk facing side portion 63. It is preferred that the recess 95 be sized sufficiently to accommodate a raised knob (not shown) remaining after the removal of a limb. The first, second and third trimming members 42,43,84 each have a knife portion 96 removably connected thereto. Each knife portion 96 further comprises an knife edge portion 99, as shown. As will be appreciated by those skilled in such art, it is preferred that the first and second tree engaging device 51,67 be located a distance remote from each respective knife edge portion 99 which allows an operator to select a knife portion 96 in which the knife edge portion 99 is orientated at an angle φ, preferably an angle greater than 0 degrees, relative to the tree trunk surface 100, when the knife edge portion 99 is situated adjacent to the tree trunk 31 (e.g., when the tree engaging portion 54 engages the tree trunk 31). Although it is to be understood that an angle of zero degrees (e.g., the knife edge portion oriented approximately parallel to the tree trunk surface 100) may be used if desirable. Each of the first, second and third trimming members 42,43,84 may also comprise a rear knife portion 103 for further trimming the tree 11 when the tree is reversibly translated relative to the frame.

Attachment of each first, second and third tree engaging devices 51,67,85 to their respective first, second and third trimming members 42,43,84 will now be discussed with reference again to FIG. 3. The first trimming member 42 is provided with an opening 104 sized to receive the attachment portion 55. Removal of the first tree engaging device is accomplished by removal of the fasteners 59 which are received by preferably threaded apertures (not shown) provided in the first trimming member 42. Once the fasteners 59 are removed the attachment portion 55 can be removed from the opening 104. Once the attachment portion 55 is removed shims 62 may be removed or added to the attachment portion 55.

To provide efficient contact between the shims 62 and the tree trunk facing side portion 63, the shims 62 and tree engaging portion 54 may be selected to have contours which match the contours of the tree trunk facing side portion 63. In addition, the attachment portion 55 may be provided with more than two suitably spaced apertures 58 so as to provide the aforementioned efficient contact with the shims 62 and the tree trunk facing side portion 54 and to ensure that at least one aperture 58 is concentrically aligned with at least one threaded aperture (not shown) provided in the first trimming member regardless of the number of shims 62 in use. Attachment and removal of the second and third tree engaging devices 67,85 from their respective second and third trimming members 43,84 is as substantially described above and will not be elaborated on any further herein.

Furthermore, although the preferred method of adjusting the transverse position of the first, second and third tree engaging devices 51,67,85 relative to their respective first, second and third trimming members 42,43,84, which results in an adjustment in the lateral positions of the first, second and third trimming members 42,43,84 relative to the tree trunk 31, is as disclosed above, other non-obvious means may be used such as, for example, electrical, mechanical and hydraulic actuation.

A method of trimming a variety of tree 11 types having tree trunks 31 with a harvesting head 10 having a frame 14, a driving device 23 connected to the frame 14, and a first trimming member 42 pivotally connected to the frame 14, the first trimming member 42 having a tree engaging device 51 and a knife portion 96 attached therewith includes selecting a knife portion 96, having an angled edge portion 99, for the type of tree 11 to be harvested, attaching the knife portion 96 to the first trimming member 42, adjusting the tree engaging device 51 so as to adjust a transverse position relative to the tree trunk 31 of the first trimming member 42, positioning the frame 14 of the harvesting head 10 adjacent the tree trunk 31, moving the first trimming member 42 relative to the frame 14 to a position at which the tree engaging device 51 is engaged with the tree trunk 31, and moving a one of the tree and harvesting head relative to an other of the tree and harvesting head and trimming the tree with the trimming member.

The method also includes moving the driving device 23 relative to the frame 14 and longitudinally translating the tree trunk 31 relative to the first trimming member 42.

Industrial Applicability

With reference to the Figures, and in operation, upon positioning the tree harvesting head 10 adjacent to the tree 11 to be trimmed, the clamp arms 35 and first and second trimming members 42,43 are then closed to capture and support the tree trunk 31 therebetween. The knife portions 96 of the first, second and third trimming members 42,43,84 engage the limbs of the tree 11 during longitudinal translation of the tree trunk 31 and cut the limbs from the tree trunk 31. Debarking of the tree trunk 31 may also occur during this longitudinal tree translation.

First, second and third tree engaging devices 51,67,85 are attached to the respective first, second and third trimming members 42,43,84 and each are transversely adjustable relative to their respective trimming members 42,43,84. The aforementioned transverse adjustability is preferably accomplished by shims 62,78,91 removably attached between each tree engaging portion 54,70,80 and respective adjacent tree trunk facing side portion 63,79,92. As should be apparent to those skilled in such art, providing the aforementioned transverse adjustability may allow for optimal transverse positioning of the trimming members 42,43,84 for the variety of tree 11 to be trimmed.

Each respective knife edge portion 99 is structured and arranged to be oriented at an angle $\phi$ (as shown in FIG. 3), relative to the tree trunk surface 100, when each respect tree engaging portion 54,70,80 engages the tree 11. By providing the knife edge portion 99 with a more aggressive angle $\phi$ it may be possible to more efficiently trim the tree 11 by reducing the size of the resulting knobs (not shown) remaining after a branch (not shown) is removed. As should be apparent to those skilled in such art, the operator may match a knife edge portion 99, having a given angle $\phi$, with those characteristics of a forest to be harvested to most efficiently perform the trimming operations.

Each of the first, second and third tree engaging devices 51,67,85 are attached to the respective first, second and third trimming members 42,43,84 at a location remote from their respective knife edge portions 99. The distance may be readily selectable by one skilled in such art without undue experimentation based on the variety of tree 11 to be harvested. Each of the first, second and third trimming members 42,43,84 are provided with respective substantially concave tree trunk facing side portions 63,79,92 substantially between the knife edge portions 99 and their respective first, second and third tree engaging devices 51,67,85 forming a recess 95 (as shown, for example, in FIG. 3) therein. By providing the recess 95 with sufficient size to accommodate the largest resulting knob (not shown) the lateral spacing, relative to the tree trunk 31, of the knife edge portions 99 may be more easily maintained adjacent the tree trunk surface 100 which may result in more efficient trimming.

Other aspects, objects and advantages of this invention can be obtained from a study of the drawings, the disclosure and the appended claims.

What is claimed is:

1. A trimming apparatus for a tree harvesting head having a frame and a driving device connected to the frame and moveable so as to translate a tree trunk longitudinally relative to the frame, comprising:
   a first trimming member having a tree trunk facing side portion;
   a first tree engaging device statically attached to said first trimming member and configured to maintain the first trimming member at a transverse position relative to the tree trunk during said longitudinal translation of the tree trunk; and
   said first trimming member includes a knife portion, said knife portion including a knife edge portion structured and arranged to form an angle relative to a surface of the tree trunk when adjacent the tree trunk.

2. The apparatus of claim 1 wherein said first tree engaging device is transversely adjustable relative to said first trimming member.

3. The apparatus of claim 1 wherein said first trimming member further comprises a substantially concave tree trunk facing side portion substantially between said first trimming member end portion and said first tree engaging device forming a recess therein.

4. The apparatus of claim 1 wherein said angle is greater than zero degrees.

5. The apparatus of claim 1 wherein said first tree engaging device is attached to said first trimming member at a distance remote from said knife edge portion.

6. The apparatus of claim 1 further comprising:
   a second trimming member coupled to the frame; and
   a second tree engaging device attached to said second trimming member and configured to maintain the second trimming member at a transverse position relative to the tree trunk during longitudinal translation of the tree trunk.

7. The apparatus of claim 6 wherein said second tree engaging device is transversely adjustable relative to said second trimming member.

8. The apparatus of claim 6 wherein said second trimming member comprises a substantially concave tree facing side portion substantially between said second trimming member end portion and said second tree engaging device forming a recess therein.

9. The apparatus of claim 6 wherein said second trimming member includes a knife portion, said knife portion including a knife edge portion structured and arranged to form an angle relative to a surface of the tree trunk when adjacent the tree trunk.

10. The apparatus of claim 9 wherein said angle is greater than zero degrees.

11. The apparatus of claim 9 wherein said second tree engaging device is attached to said second trimming member at a distance remote from said knife edge portion.

12. The apparatus of claim 6 wherein said first tree engaging device and said second tree engaging device comprises:
   a tree engaging portion configured to engage a surface of the tree trunk;
   an attachment portion attached to said tree engaging portion; and
   means for transversely adjusting said tree engaging portion relative to said first trimming member and said second trimming member.

13. The apparatus of claim 12 wherein each of said tree trunk facing side portions includes at least one opening structured and arranged to receive said attachment portion.

14. The apparatus of claim 12 further comprising a third trimming member fixedly connected to said frame at a location between said first and second trimming members, said third trimming member including a third tree engaging device.

15. The apparatus of claim 14 wherein said third tree engaging device comprises:
   a tree engaging portion configured to engage a surface of the tree trunk;
   an attachment portion attached to said tree engaging portion; and
   means for transversely adjusting said tree engaging portion relative to said third trimming member.

16. A tree harvesting head comprising:
   a frame;
   at least one trimming member connected to and movable relative to said frame;
   a driving device connected to said frame and movable to translate a tree trunk longitudinally relative to said frame;
   a tree engaging device statically attached to at least one said trimming member and configured to maintain the trimming member at a transverse position relative to the tree trunk;
   each said trimming member including a knife portion having a knife edge portion structured and arranged to form an angle relative to a surface of the tree trunk when situated adjacent the tree trunk;
   each said trimming member having a substantially concave tree trunk facing side portion substantially between said knife edge portion and said tree engaging device forming a recess therein; and
   said tree engaging device attached to said trimming member at a distance remote from said knife edge portion.

17. A tree engaging device for use with a tree harvesting head having at least one trimming member, comprising:
   a tree engaging portion configured to engage a surface of the tree trunk;
   an attachment portion attached to said tree engaging portion and structured and arranged for coupling said tree engaging portion to said trimming member; and
   at least one shim structured and arranged for attachment to said attachment portion substantially between said tree engaging portion and said trimming member.

* * * * *